United States Patent
Ohtani et al.

(10) Patent No.: US 7,216,112 B2
(45) Date of Patent: May 8, 2007

(54) MEMORY SYSTEM, MEMORY METHOD, AND ROBOTIC APPARATUS

(75) Inventors: Shinya Ohtani, Tokyo (JP); Jun Yokono, Tokyo (JP)

(73) Assignee: Sony Corporation, Tokyo (JP)

( * ) Notice: Subject to any disclaimer, the term of this patent is extended or adjusted under 35 U.S.C. 154(b) by 534 days.

(21) Appl. No.: 10/388,559

(22) Filed: Mar. 14, 2003

(65) Prior Publication Data

US 2003/0233170 A1 Dec. 18, 2003

(30) Foreign Application Priority Data

Mar. 15, 2002 (JP) ............................. 2002-073143

(51) Int. Cl.
*G06F 1/00* (2006.01)
*G06F 3/00* (2006.01)
*G06F 15/18* (2006.01)
*G06G 7/00* (2006.01)

(52) U.S. Cl. .......................................... 706/26; 706/12

(58) Field of Classification Search ................. 706/26, 706/12; 700/245
See application file for complete search history.

(56) References Cited

U.S. PATENT DOCUMENTS 6,175,772 B1 * 1/2001 Kamiya et al. ............... 700/31

FOREIGN PATENT DOCUMENTS

JP 2001 52175 2/2001

* cited by examiner

*Primary Examiner*—Joseph P Hirl
(74) *Attorney, Agent, or Firm*—Frommer Lawrence & Haug LLP; William S. Frommer

(57) ABSTRACT

A memory system and a method as well as robotic apparatus are strong against noise and excellent in memory capacity, volume of calculation, quantity of physical memory, and memory responsiveness. It is designed to store, in the frame form, the first information on a symbol as well as the second information on a symbol supplied separately from a variety of inputs in relation to competitive neurons corresponding to the symbol in a way to strengthen the connection between relevant input neurons and competitive neurons in response to the input patterns of a variety of inputs for each symbol with the use of a competitive neural network having a set of input layers composed of a plurality of input neurons and a set of competitive layers composed of a plurality of competitive neurons.

4 Claims, 14 Drawing Sheets

MEMORY SYSTEM, MEMORY METHOD, AND ROBOTIC APPARATUS

BACKGROUND OF THE INVENTION

1. Field of the Invention

This invention relates to a memory system and a memory method as well as robotic apparatus, and is preferably applicable to an entertainment robot for example.

2. Description of the Rerlated Art

There has been proposed a system utilizing a competitive neural network as an associative memory system applicable to entertainment robots.

In this associative memory system, as shown in FIG. 12, input patterns composed of combinations of recognized results (hereinafter, referred to as "ID" as in color IDs, shape IDs, and face IDs, etc.) of each identifying system about several factors (for example, color, shape, and face, etc.) regarding an event or a thing (a symbol) being an object, are stored as memory patterns $P_1-P_n$, and as shown in FIG. 13, the input of a certain pattern (a key pattern) recollects and outputs memory patterns $P_1-P_n$ analogous to it from among the same memory patterns $P_1-P_n$ stored. Note that in FIGS. 12 and 13 the squares positioned at the same height in the input patterns and the memory patterns $P_1-P_n$ signify the same factors, and that differences in pattern in the same factor indicate that results recognized from it differ.

Therefore, according to such an associative memory system as this, when a pattern similar to memory patterns $P_1-P_n$ stored in memory process is entered, a complete pattern complemented with the information of a missing factor can be output so that it may be possible to associate the identified result of the face with the name of a particular person for example.

FIG. 14 shows a typical example of the structure of an associative memory system to which a competitive neural network is applied. As shown in FIG. 14, this competitive neural network is structured as a hierarchical neural network composed of two sets of layers: input layers and competitive layers.

In this case, there are arranged in a set of input layers the number of input neurons equivalent to the aggregate of the number (m pieces) of IDs regarding the factor 1, the number (n pieces) of IDs regarding the factor 2, and so forth. And, each input neuron is assigned an identified result $ID_1-ID_m$, $ID_1-ID_n$, . . . from a relevant identifying system.

Also, a plurality of competitive neurons are provided in a set of competitive layers, each competitive neuron connected to each input neuron in the input layers with a certain degree of connection weight. Each of these competitive neurons is equivalent to one symbol (a conceptual object) to be stored. Note that the connection weight of the input layers and the competitive layers takes any value of from zero (0) to one (1) with the initial connection weight determined at random.

A competitive neural network provides two operation modes, namely a memory mode and a recollecting mode; in the memory mode input patterns are stored competitively, and in the recollecting mode complete patterns $P_1-P_n$ (FIGS. 12 and 13) is recollected from an input pattern missing partially.

Storing such a competitive neural network in the memory mode is performed by selecting a competitive neuron having fought it out in the competitive layers for an input pattern desired to be stored, and by strengthening a connection between the competitive neuron and each input neuron.

Here, in the input pattern vector $[x_1, x_2, \ldots, x_n]$, the input neuron $x_1$ corresponds to the first identified result $(ID_1)$ of the identifying system in regard to Factor 1, and the input of the first identified result ignites the input neuron $X_1$, giving rise to such ignition on other factors in succession as well. An ignited input neuron takes the value of "1", a not-ignited input neuron the value of "−1".

And, assuming the connection weight of the $i^{th}$ input neuron and the $j^{th}$ competitive neuron as $W_{ij}$, the value of a competitive neuron $y_1$ against the input $x_1$ is expressed by the following Expression (1):

$$y_i = \sum_{i=0}^{NumOfInput} W_{ji} X_i \qquad (1)$$

Therefore, a competitive neuron winning out the competition can be sought by the following Expression (2):

$$\max \{y_i\} \qquad (2)$$

Also, in this manner the updating of the connection weight $W_{ji}$ of the competitive neuron winning out the competition and the input neuron is performed by the following Expression (3), in accordance with the Kohonen's updating rules:

$$\Delta W_{ji} = \alpha(X_i - W_{ji}) \quad \alpha: \text{Learning Ratio}$$

$$W_{ji}(\text{new}) = \Delta W_{ji} + W_{ji}(\text{old}) \qquad (3)$$

At this point, regulating it with L2Norm leads to the following Expression (4):

$$W_{ji}(\text{new}) = \frac{W_{ji}(\text{new})}{\sqrt{\sum_{i}^{NumOfInout} W_{ji}^2}} \qquad (4)$$

Consequently the connection weight $W_{ji}$ (new) obtained in the Expression (4) denotes the strength of a new memory after being updated, which comes to be a retentive memory.

Note that in Expression (4), the learning ratio $\alpha$ is a parameter denoting the relations between the number of times presented and memory. The greater the learning ratio $\alpha$ is, what is once retained will not be forgotten, and so, when a like pattern is presented next time, the retained pattern can be associated with, almost without fail.

Next, the recollecting mode is described. Assume that a certain input pattern vectors $[x_1, x_2, \ldots, x_n]$ are presented. These input pattern vectors $[x_1, x_2, \ldots, x_n]$ can be an ID, or its likelihood or probability.

At this time, the value of the output neuron $y_i$ is calculated as in the following Expression (5); relative to the input pattern vector $x_1$:

$$y_i = \sum_{i=0}^{NumOfInput} W_{ji} X_i \qquad (5)$$

This Expression (5) can also be interpreted as indicating the likelihood of the igniting value of a competitive neuron corresponding to the likelihood of each factor. What is important here is that as for the likelihood inputs of a plurality of factors, the whole likelihood can be sought by connecting those likelihood inputs.

Now, supposing that it is the sole one with the greatest associated likelihood that is selected, the output neuron $y_i$ that can win competition can be obtained by the following Expression (6):

$$\max \{y_i\} \quad (6)$$

And, as the number of the competitive neuron Y obtained in this way corresponds to the number of the symbol memorized, the input pattern X can be recollected by performing an inverse matrix operation on W as in the following Expression (7):

$$Y = W \cdot X$$

$$X = W^{-1} \cdot Y = W^T \cdot Y \quad (7)$$

Thanks to the employment of a structure making memory stronger by gradually increasing the connection weight between the input neuron and the competitive neuron as described above, an associative memory system employing such a competitive neural network is designed to be capable of performing statistical addition-learning on each symbol corresponding to each competitive neuron respectively. Therefore, a conventional associative memory system using such a conventional competitive neuron network has a merit of being strong against noise.

When viewed from the opposite standpoint, however, because of that very structure, an associative memory system using such a conventional competitive neural network could perform learning on the symbol as statistical addition-learning only, and therefore, has a disadvantage of memorizing even clear information only by slow degrees.

Also, since a neural network is used in a conventional associative memory system employing a competitive neural network, it is necessary to increase the numbers of input neurons and competitive neurons accordingly so as to increase the number of types of information that can be stored and the maximum number of symbols that is memorized, causing a disadvantage of a substantial increase in the volume of calculation and the quantity of occupancy physical memory.

SUMMARY OF THE INVENTION

In view of the foregoing, an object of this invention is to provide a memory system and a memory method as well as robotic apparatus that are strong against noise, excellent in the capacity of memory, volume of calculation, quantity of physical memory and superb at memory responsiveness.

According to the present invention, in a memory system it is intended to strengthen the connection between relative input neurons and competitive neurons in response to input patterns of each of various inputs for each symbol with the use of a competitive neural network having a set of input layers composed of a plurality of input neurons and a set of competitive layers composed of a plurality of competitive neurons, thus providing memory means for storing the first information on a symbol, the memory means storing the second information on a symbol supplied separately from the various inputs in the frame form related to the competitive neuron corresponding to the symbol, with the results that the statistical addition-learning is performed for the first information, and that immediate learning can be done for the second information, thus realizing memory systems that are strong against noise and excellent in the memory capacity, volume of calculation, physical memory quantity, and superb at memory responsiveness.

Also according to the present invention, in a memory method it is intended to strengthen the connection between relative input neurons and competitive neurons in response to input patterns of each of various inputs for each symbol with the use of a competitive neural network having a set of input layers composed of a plurality of input neurons and a set of competitive layers composed of a plurality of competitive neurons, thus providing the first step of storing the first information on a symbol, and at the first step storing is performed for the second information on the symbol supplied separately from the various inputs in the frame form related to the competitive neuron corresponding to the symbol, with the results that the statistical addition-learning is performed for the first information, and that immediate learning can be done for the second information, thus realizing memory method systems that are strong against noise and excellent in the memory capacity, volume of calculation, physical memory quantity, and superb at memory responsiveness.

Furthermore, according to the present invention, in a robotic apparatus it is intended to strengthen the connection between relative input neurons and competitive neurons in response to input patterns of each of various inputs for each symbol with the use of a competitive neural network having a set of input layers composed of a plurality of input neurons and a set of competitive layers composed of a plurality of competitive neurons, thus providing memory means for storing the first information on a symbol, the memory means storing the second information on a symbol supplied separately from the various inputs in the frame form related to the competitive neuron corresponding to the symbol, with the results that the statistical addition-learning is performed for the first information, and that immediate learning can be done for the second information, thus realizing robotic apparatus that are strong against noise and excellent in the memory capacity, volume of calculation, physical memory quantity, and superb at memory responsiveness.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Preferred embodiments of this invention will be described with reference to the accompanying drawings:

(1) Structure of a Robot in Present Embodiment

Figure 1:
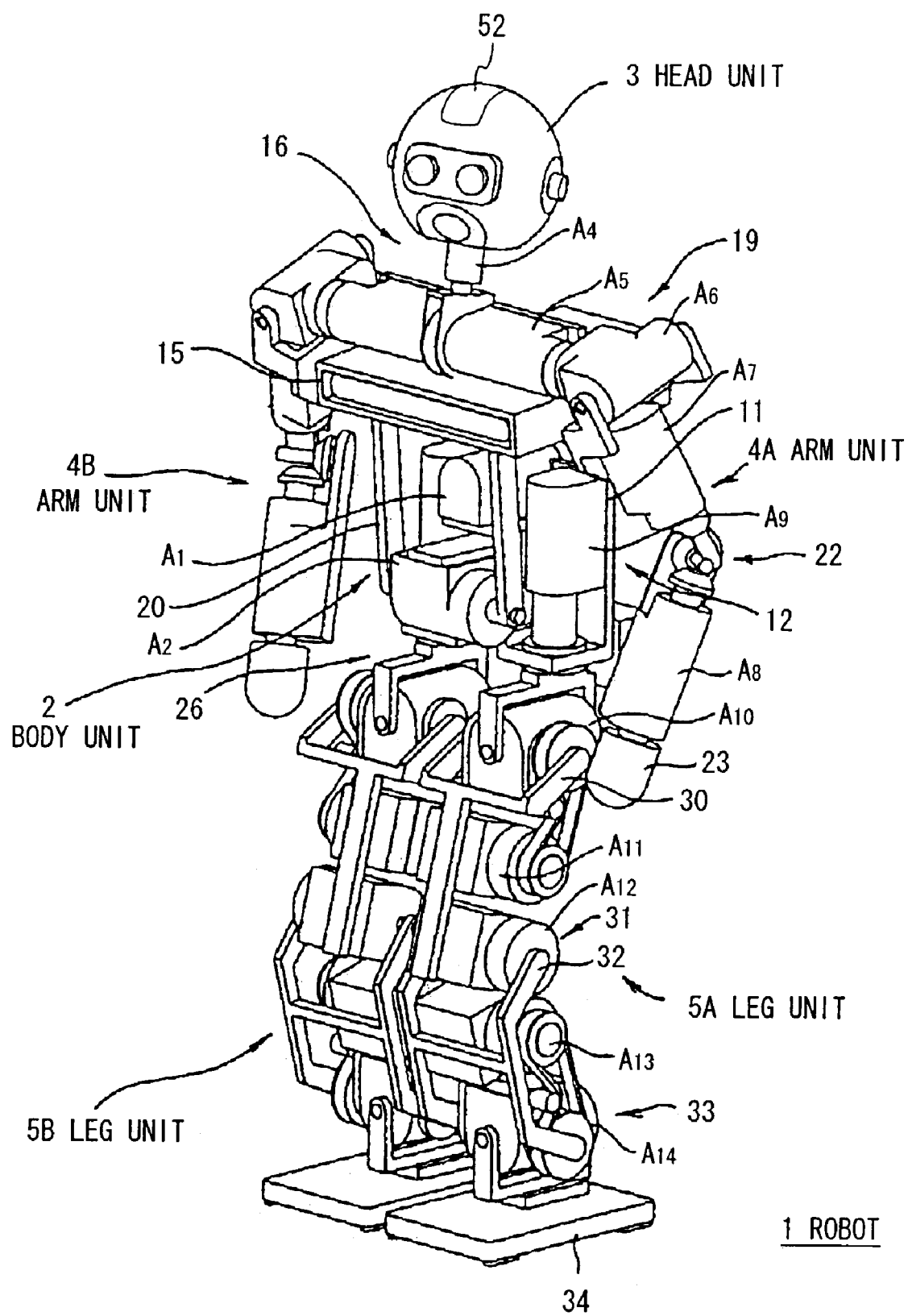
FIG. 1 is a perspective diagram showing the exterior construction of a robot in the present embodiment.
Figure 2:
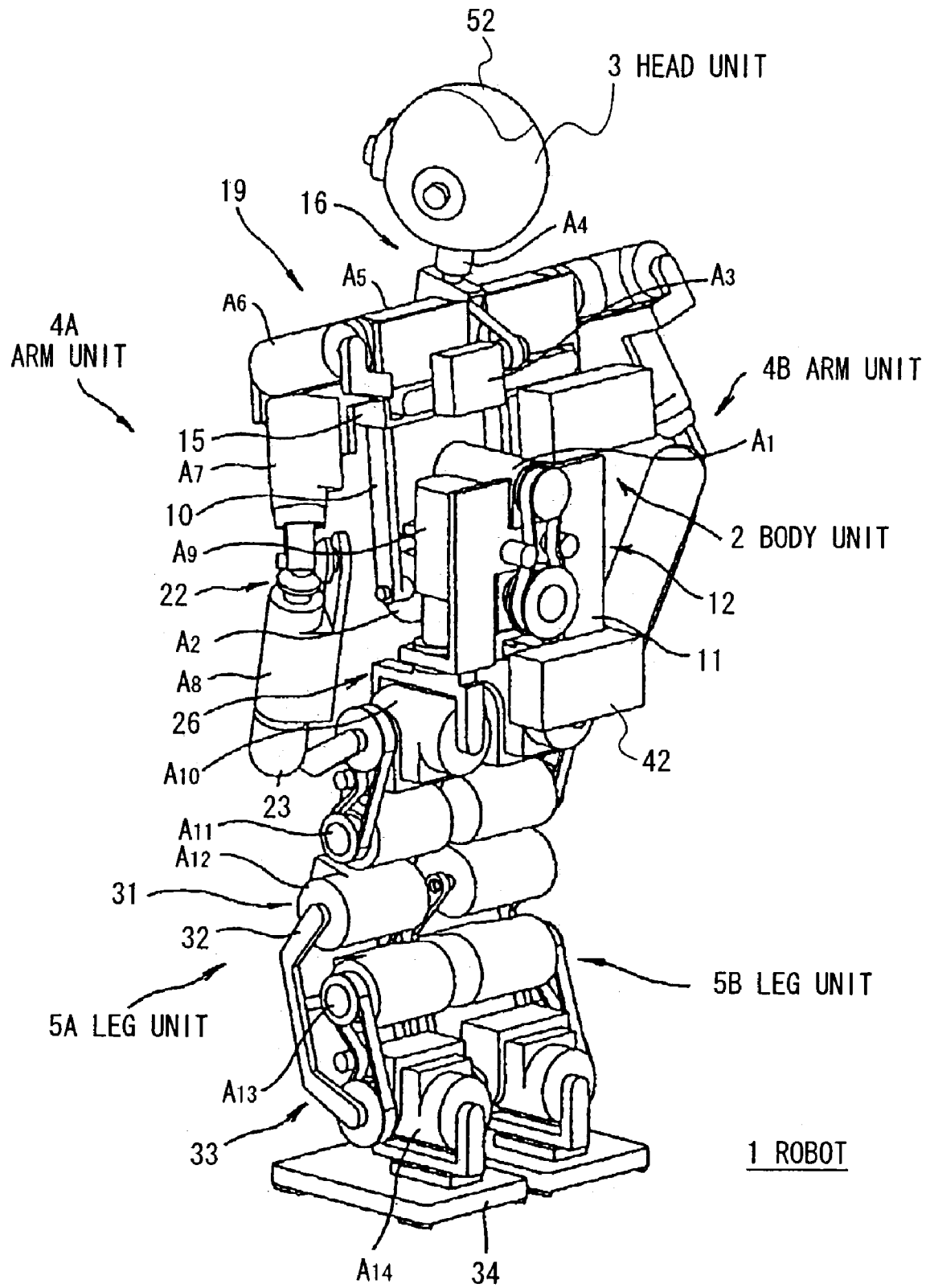
FIG. 2 is a perspective diagram showing the exterior construction of a robot.

In FIGS. 1 and 2 numeral reference 1 shows the whole of a two-footed walking robot in the present embodiment, wherein a head unit 3 is placed at the top of a body unit 2, each of arm units 4A, 4B of the same construction at the top left and right of the body unit 2 respectively, and each of leg units 5A and 5B of the same construction in place at the bottom left and right of the body unit 2 respectively.

Figure 3:
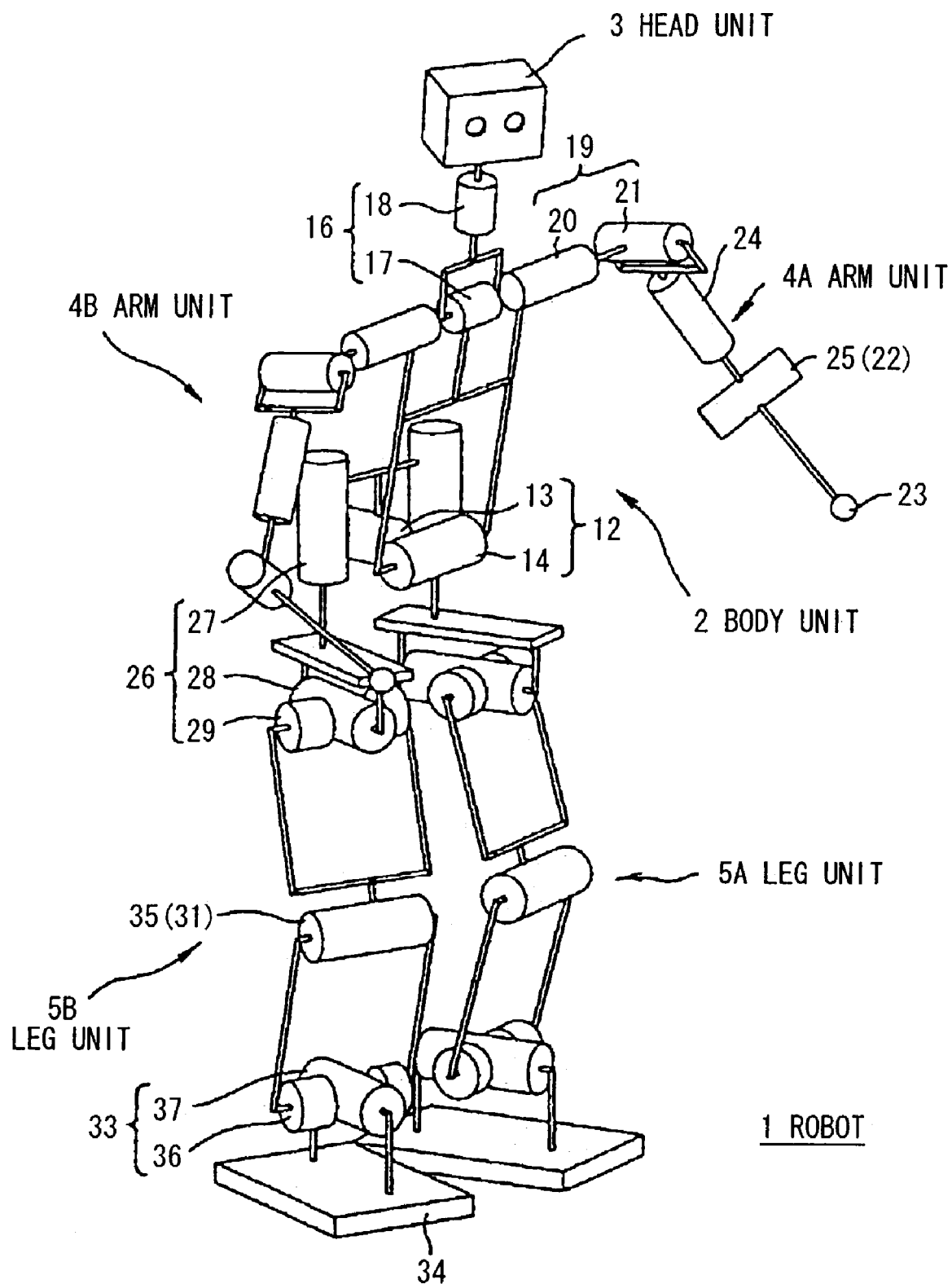
FIG. 3 is a schematic diagram used in explaining the exterior construction of a robot.

The body unit 2 is made up of a frame 10 forming the upper part of the main body and a waist base 11 forming the lower part of the main body, both connected thereto by the medium of a waist joint mechanism 12, and it is designed such that driving each actuator $A_1$, $A_2$ of the waist joint mechanism 12 fixed at the waist base 11 of the lower part of the main body causes the upper part of the main body to rotate independently around a roll axis 13 and a pitch axis 14 shown in FIG. 3, which intersect each other at right angles.

Also, the head unit 3 is mounted at the center part of a shoulder base 15 secured to the upper end of the frame 10 by the medium of a neck joint mechanism 16, and it is designed such that driving each actuator $A_3$, $A_4$ of the neck joint mechanism 16 causes the head unit 3 to rotate independently around a pitch axis 17 and a yaw axis 18 shown in FIG. 3, which intersect each other at right angles.

Furthermore, each of the arm units 4A, 4B is fixed at the left and right part of the shoulder base 15 by the medium of a shoulder joint mechanism 19, and it is designed such that driving each actuator $A_5$, $A_6$ of the shoulder joint mechanism 19 causes each of the arm units 4A, 4B to rotate independently around a pitch axis 20 and a roll axis 21 shown in FIG. 3, which intersect each other at right angles.

In this case, as for the arm units 4A, 4B, an actuator $A_8$ forming a forearm is linked by way of an elbow joint mechanism 22 to the output power axis of an actuator $A_7$ forming each of upper arms, furthermore with an arm unit 23 fixed at the tip of the forearm.

And at each arm unit 4A, 4B a forearm is rotated around a yaw axis 24 shown in FIG. 3 by driving the actuator $A_7$, and driving the actuator $A_8$ causes the forearm to rotate around a pitch axis 25 shown in FIG. 3.

On the other hand, each leg unit 5A, 5B is attached to the waist base 11 of the lower part of the main body by the medium of a hip joint mechanism 26, and it is designed such that driving each actuator $A_9$–$A_{11}$ of the hip joint mechanism 26 causes each leg unit 5A, 5B to rotate independently around a yaw axis 27, a roll axis 28, and a pitch axis 29 shown in FIG. 3, which intersect one another at right angles.

In this case, each leg unit 5A, 5B has a frame 30 forming each femoral region, the lower end of which is linked with a frame 32 forming a crural part by the medium of a knee joint mechanism 31, and furthermore a foot unit 34 is linked to the lower end of the frame 32 by the medium of an ankle joint mechanism 33.

Therefore, in each leg unit 5A, 5B driving an actuator $A_{12}$ forming the knee joint mechanism 31 can cause the crural part to rotate around a pitch axis 35 shown in FIG. 3, and furthermore it is designed such that driving each actuator $A_{13}$, $A_{14}$ of the ankle joint mechanism 33 causes the foot unit 34 to rotate independently around a pitch axis 36 and a roll axis 37 shown in FIG. 3, which intersect each other.

Figure 4:
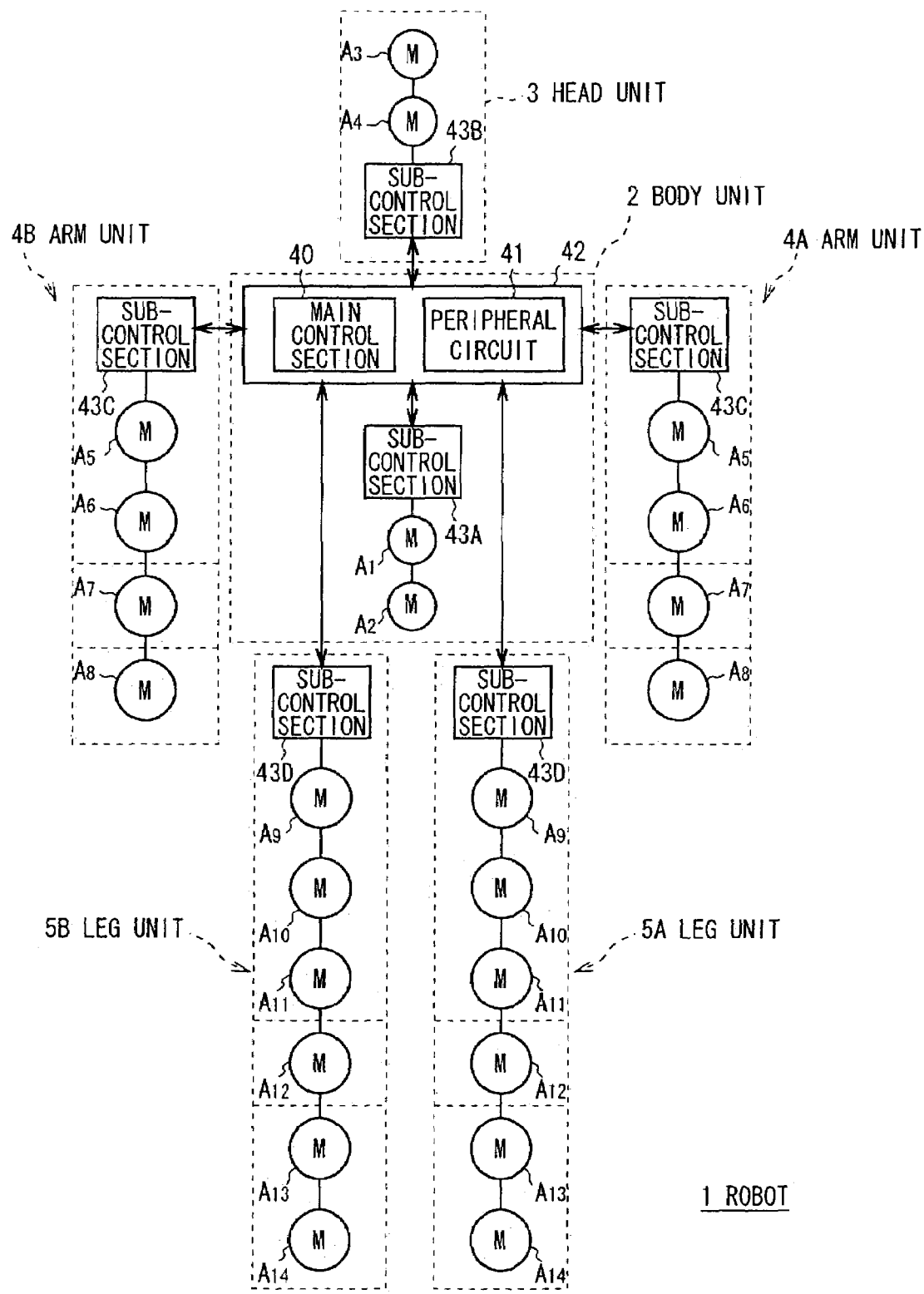
FIG. 4.is a block diagram used in explaining the interior construction of a robot.
Figure 5:
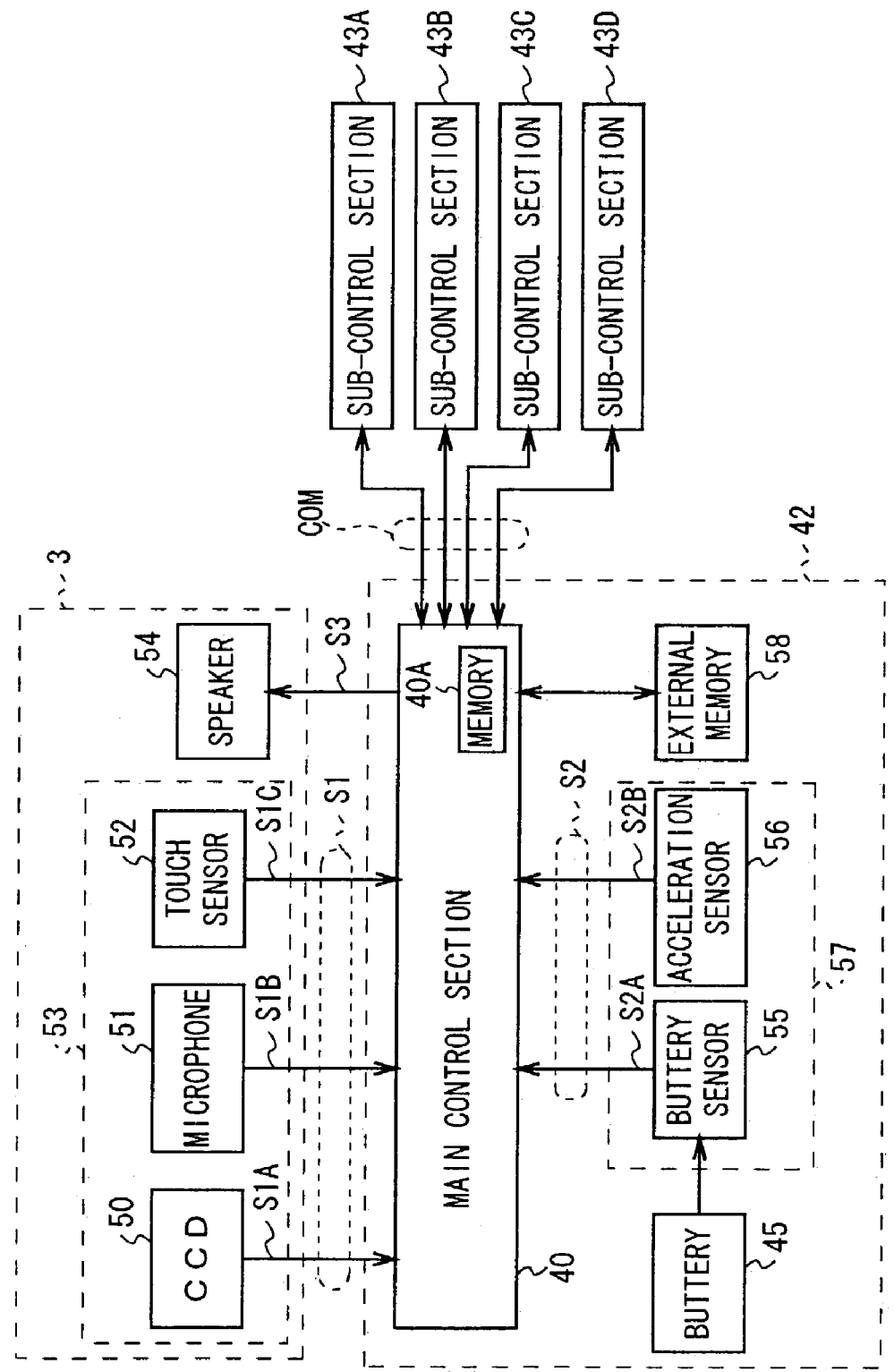
FIG. 5 is a block diagram used in explaining the interior construction of a robot.

On the other hand, as shown in FIG. 4, mounted on the back of the waist base 11 forming the lower part of the main body of the body unit 2 is a control unit 42 housed in a box comprising a main control section 40 governing the operational controlling of the whole of the robot 1, a peripheral circuitry 41 including power source circuits and communication circuits, etc., and a battery 45 (FIG. 5).

And this control unit 42 is connected to each sub-control sections 43A–43D, each placed inside of each constituent unit (body unit 2, head unit 3, each arm unit 4A, 4B, and each leg unit 5A, 5B), and is designed to be capable of feeding a necessary power source voltage to each sub-control sections 43A–43D and of performing communication with these sub-control sections 43A–43D.

Also, each sub-control sections 43A–43D is connected to each actuator $A_1$–$A_{14}$ located inside of each corresponding constituent unit, which can be driven in a predetermined state based on a variety of control commands given from the main control section 40.

Furthermore, arranged at the designated positions on the head unit 3 are, as shown in FIG. 5, an external sensor unit 53 comprising a Charge Coupled Device (CCD) camera 50 functioning as the "eye" of the robot 1, a microphone 51 functioning as the "ear" of the robot 1, and a touch sensor 52, and a speaker 54 functioning as the "mouth" of the robot 1, and the control unit 42 incorporates into it an internal sensor unit 57 comprising a battery sensor 55 and an acceleration sensor 56, etc.

Then the CCD camera 50 in the external sensor unit 53 captures the situation about the environment, the captured image signal S1A being sent out to the main control unit, while the microphone 51 collects a variety of audio commands such as "Walk", "Lie down", and "Chase the ball" given as audio inputs by a user, the audio signal S1B obtained as a result of which is sent out to the main control section 40.

Also, placed at the top of the head unit 3, as is apparent in FIGS. 1 and 2, the touch sensor 52 detects a pressure perceived due to physical influence caused by the user, such as "stroke" or "pat", and the detected result of which is sent out as a pressure detected signal S1C to the main control section 40.

Furthermore, the battery sensor 55 in the internal sensor unit 57 detects the remaining energy of the battery 45 at a predetermined period, the detected result of which is sent as a battery remaining quantity detected signal S2A to the main control section 40, while the acceleration sensor 56 detects acceleration in three axial directions (x-axis, y-axis, and z-axis) at a predetermined period, the detected result of which is sent out as an acceleration detected signal S2B to the main section 40.

The main control section 40 judges the environment surrounding the robot 1, the internal state of the robot 1, whether or not there are commands and influence by the user based on the image signal S1A, audio signal S1B, and pressure detected signal S1C, etc. (they are put together and called "external sensor signal S1" hereinafter) supplied from the CCD camera 50, the microphone 51, and the touch sensor 52, etc. in the external sensor unit 53 respectively, and on the battery remaining quantity detected signal S2A and the acceleration detected signal S2B (they are put together and called "internal sensor signal S2" hereinafter) supplied from the battery sensor 55 and acceleration sensor 56, etc. in the internal sensor unit 57.

Then the main control section 40 determines subsequent behavior based on the judged results, a control program stored beforehand in the internal memory 40A, and various control parameters stored in an external memory 58 then installed, the control commands based on the results of which are sent to appropriate sub-control sections 43A–43D. As a result, relevant actuators $A_1$–$A_{14}$ are set in motion based on those commands and under control of the sub-control sections 43A–43D, thus enabling the robot 1 to embody behavior such as swiveling the head unit 3 up and down, left to right, raising the arm units 4A, 4B, and walking.

At this time the main control section 40 also feeds a predetermined audio signal S3, as needed, to the speaker 54, thereby outputting audio sounds conforming to the audio signal S3, or outputs a driving signal to the LEDs functioning as the "eye" looking like eyes, arranged in place on the head unit 3, to make them blink.

Thus the robot 1 is designed to be capable of behaving autonomously in response to the surrounding environment it is placed in and the internal situation, and based on whether or not there are commands or influence from the user.

(2) Structure of Associative Memory System in Robot 1

Next, explanation is given on an associative memory system in the robot 1.

(2-1) Outline of Associative Memory System in Present Embodiment

As described above, there are drawbacks to the associative memory system employing a competitive neural network; that because of a structural characteristic that storage is performed with the statistical addition-learning, even clear information can be stored only gradually, and that due to the employment of a neural network, an increase in the types of information and the maximum number of symbols that can be stored increases the volume of calculation and the quantity of occupancy physical memory markedly.

Meantime, there are a "semantic network model" and a "frame model" available as memory models having a capability of complementing the drawbacks of such a competitive neural network.

Figure 6:
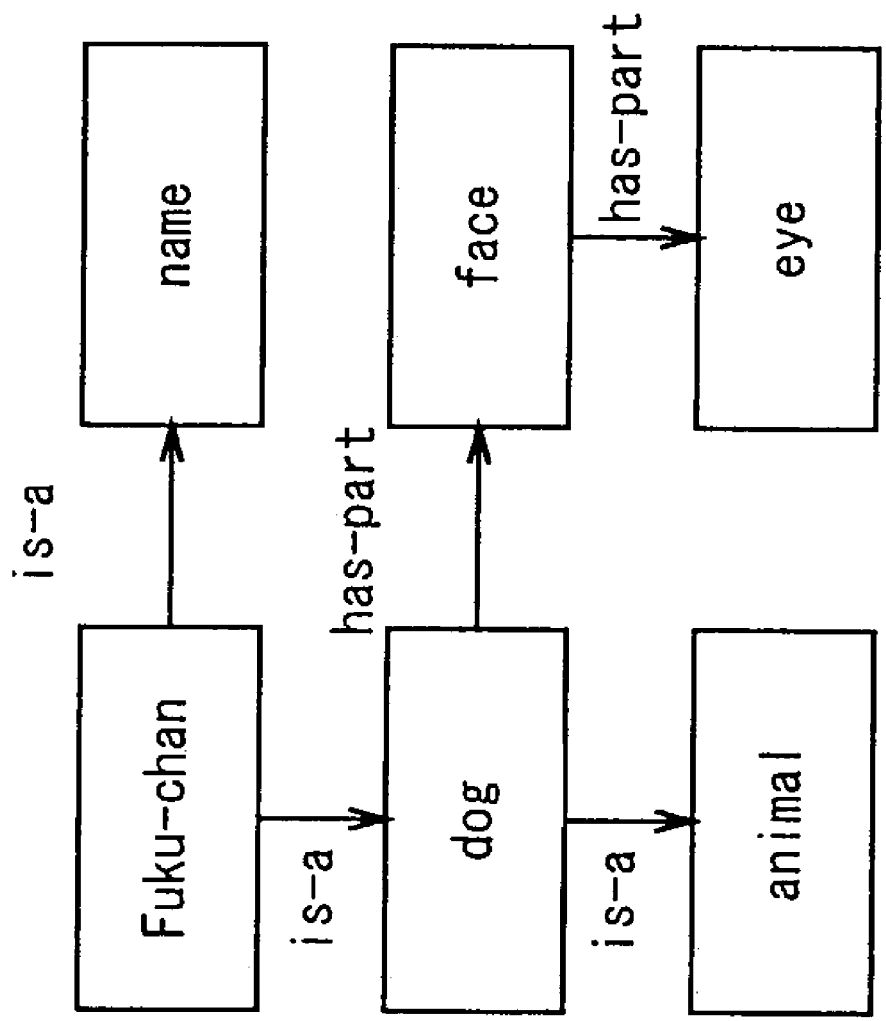
FIG. 6 is a conceptual diagram used in explaining knowledge representation by means of a semantic network model.

In this case, as shown in FIG. 6, as for the "semantic network model", the symbols $S_1$–$S_6$ are represented as nodes, among which links representing relationships thereamong are laid, and so this is a knowledge representation model making it possible to associate with a variety of knowledge by tracing the linkage. General relationships treated as links in this model include those related to the fundamental attributes of conceptual objects such as "is-a" and "has-part".

Figure 7:
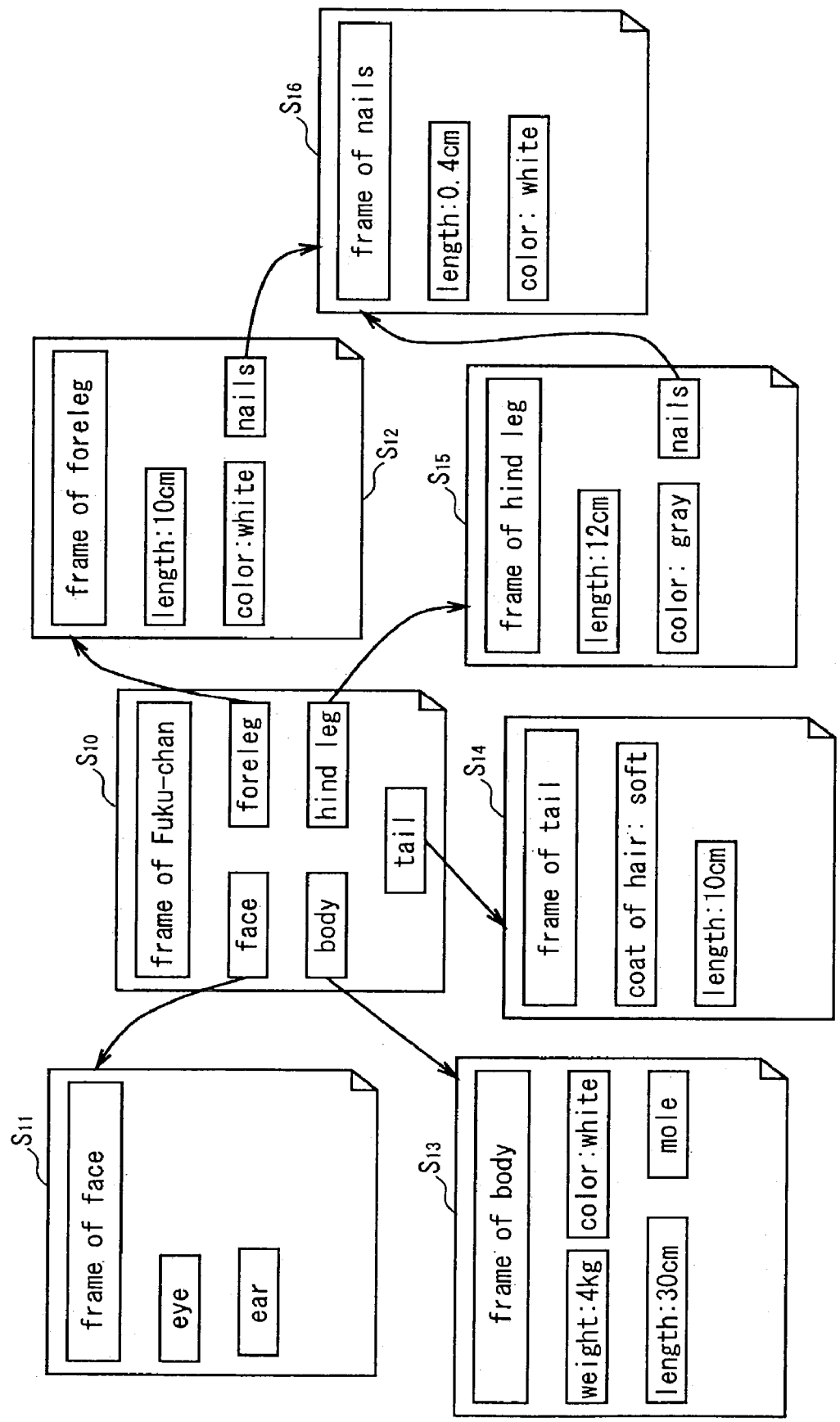
FIG. 7 is a conceptual diagram used in explaining knowledge representation by means of a frame model.

On the other hand, as shown in FIG. 7, the "knowledge representation model" is a model that represents knowledge by attaching various types of information in relation to symbols $S_{10}$–$S_{16}$ called "frame". It is almost the same model as the semantic network model, however, as against the semantic network model wherein information treated as links, such as "is-a" and "has-part", is generic in the general-purpose relationships, in the frame knowledge representation model information including relational information inherent in each symbol $S_{10}$–$S_{16}$, too, is described. Note that in terms of architecture the knowledge representation model of the frame form is equivalent to the semantic network model.

Comparing the semantic network model and the knowledge representation model of the frame form with the competitive neural network indicates that it is not necessary for the semantic network model and the frame model to remember all the connection weights among the neurons in the input-output layers as is necessary for the competitive neural network, and because what is needed is just add a point to the information to a singular symbol, the quantity of occupancy physical memory and the volume of calculation could be less. Besides, it is possible to rewrite memory immediately, different as with the statistical addition-learning by means of the neural network.

Against this backdrop, in the present invention an associative memory system is realized, drawing on advantageous characteristics of both the competitive neural network, and two types of memory systems, namely the semantic network model and the frame model.

(2-2) Structure of Associative Memory System in Present Embodiment

Next, explanation is given on the processing content of the main control section 40 regarding memory, taking memory concerning the user as an example.

Figure 8:
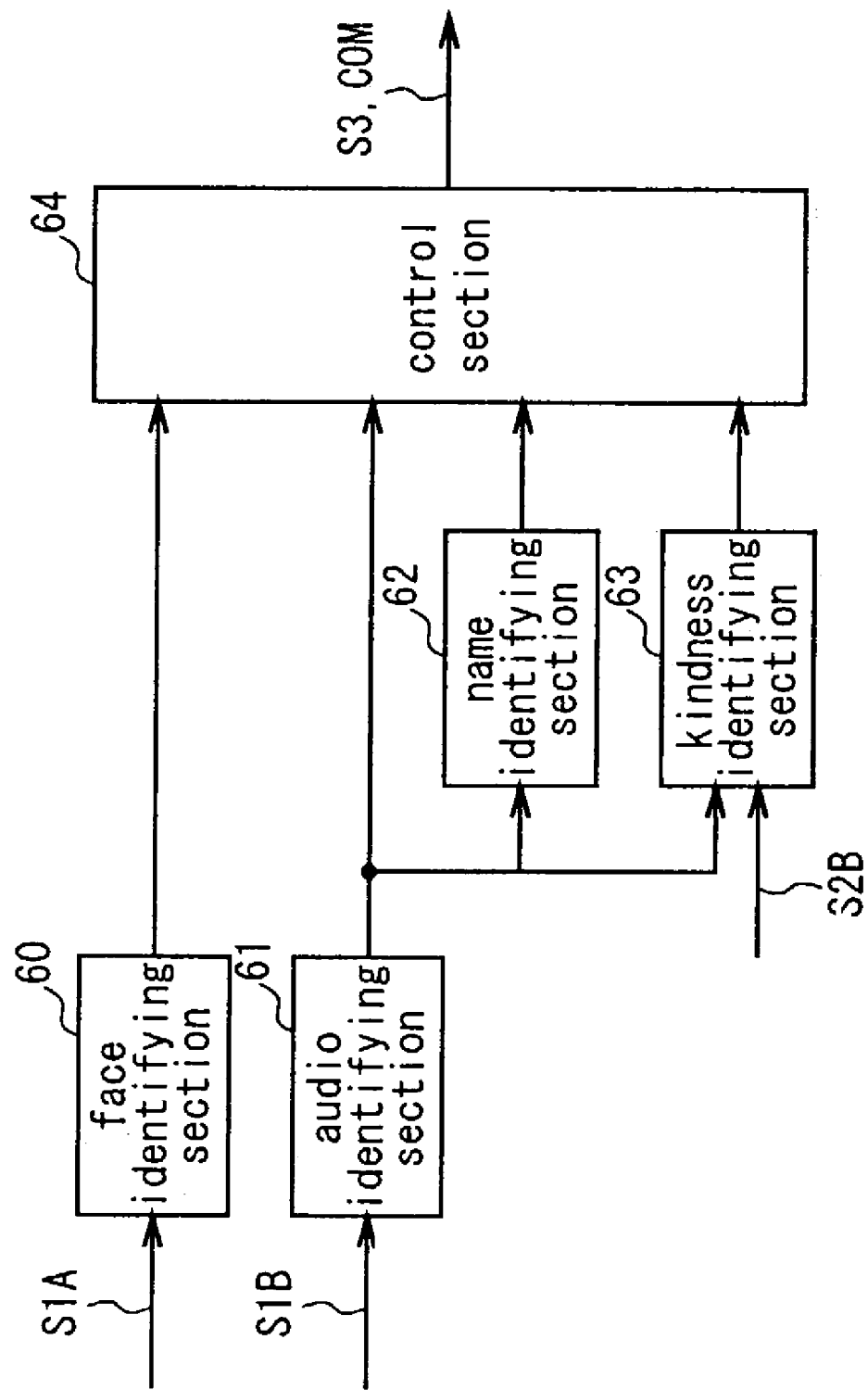
FIG. 8 is a block diagram used in explaining the processing of the main control section on user's memory.

As shown in FIG. 8, the processing content of the main control section 40 regarding memory can be divided by functions as follows: a face identifying section 60 detecting morphological features of the user's face and identifying that person based on the morphological features detected; an audio identifying section 61 distinguishing language issued by the user, a name identifying section 62 identifying the name of the user based on the result of audio identification produced by the audio identifying section 61, a kindness identifying section 63 identifying the "kindness" of the user, and a control section 64 administering the memory concerning the user based on the results identified by the face identifying section 60, the name identifying section 62, and the kindness identifying section 63.

In this case, in the face identifying section 60 the image signal S1A supplied from the CCD camera 50 (FIG. 5) is always watched on, and the morphological features of the face of a person contained within an image produced based on the image signal S1A are detected by a predetermined signal process.

Then the face identifying section 60 compares the data of the morphological features detected sequentially with the data of the morphological features of the faces of all the already-known users stored, and when the morphological features then detected agree with those of the face of any user already known, a specific identifier (this is called "FID" hereinafter) assigned to the morphological features corresponding to those of the already-known user is communicated to the control section 64.

When the detected morphological features do not coincide with the morphological features of the face of any known user, the face identifying section 60 judges that that user is a new person, subsequently detecting the morphological features of the face of that user contained within the image based on the image signal S1A supplied from the CCD camera 50, and the data of the detected morphological features is stored related to a new specific FID, which is communicated to the control section 64.

In the audio identifying section 61 the language contained in the audio signal S1B is stored by the unit of a word by performing a predetermined audio identifying process based on the audio signal S1B coming from the microphone 51 (FIG. 5), and the identified result is sent to the name identifying section 62, the kindness identifying section 63, and the control section 64.

The name identifying section 62 identifies, under control of the control section 64, the name of the user by means of the audio identified result supplied from the audio identifying section 61 in response to a user's reply to the question like "What is your name?" outputted from the speaker 54 based on the audio signal S3 given to the speaker 54 (FIG. 5) from the control section 64.

Also the name identifying section 62 compares the then identified name sequentially with the names of all the already-known users stored at this time, and when the identified name meets the name of any known user, the control section 64 is informed of a specific identifier (this is referred to as "NID" hereinafter") of the name assigned in relation to the name of the known user.

On the other hand, when the identified name does not agree with the name of any known user, and when the morphological features produced do not coincide with those of the face of any known user, the name identifying section 62 judges that that user is a new person, whose recognized name is stored related to the new specific NID, which is communicated to the control section 64.

Meanwhile, the kindness identifying section 63 identifies a kind action of the user, such as "Spoken to with kind language", or "Raised to the feet when tumbled" based on the audio identifying result from the audio identifying section 61 and the acceleration detecting signal S2B from the acceleration sensor 56 (FIG. 5), and informs the control section 64 of a relevant kindness ID chosen out of a set of kindness IDs indicating a degree of kindness set in advance.

The control section 64 retains various types of information on the users within the internal memory 40A (FIG. 5) in it, the information being administered with an associative memory system employing a competitive neural network.

Figure 9:
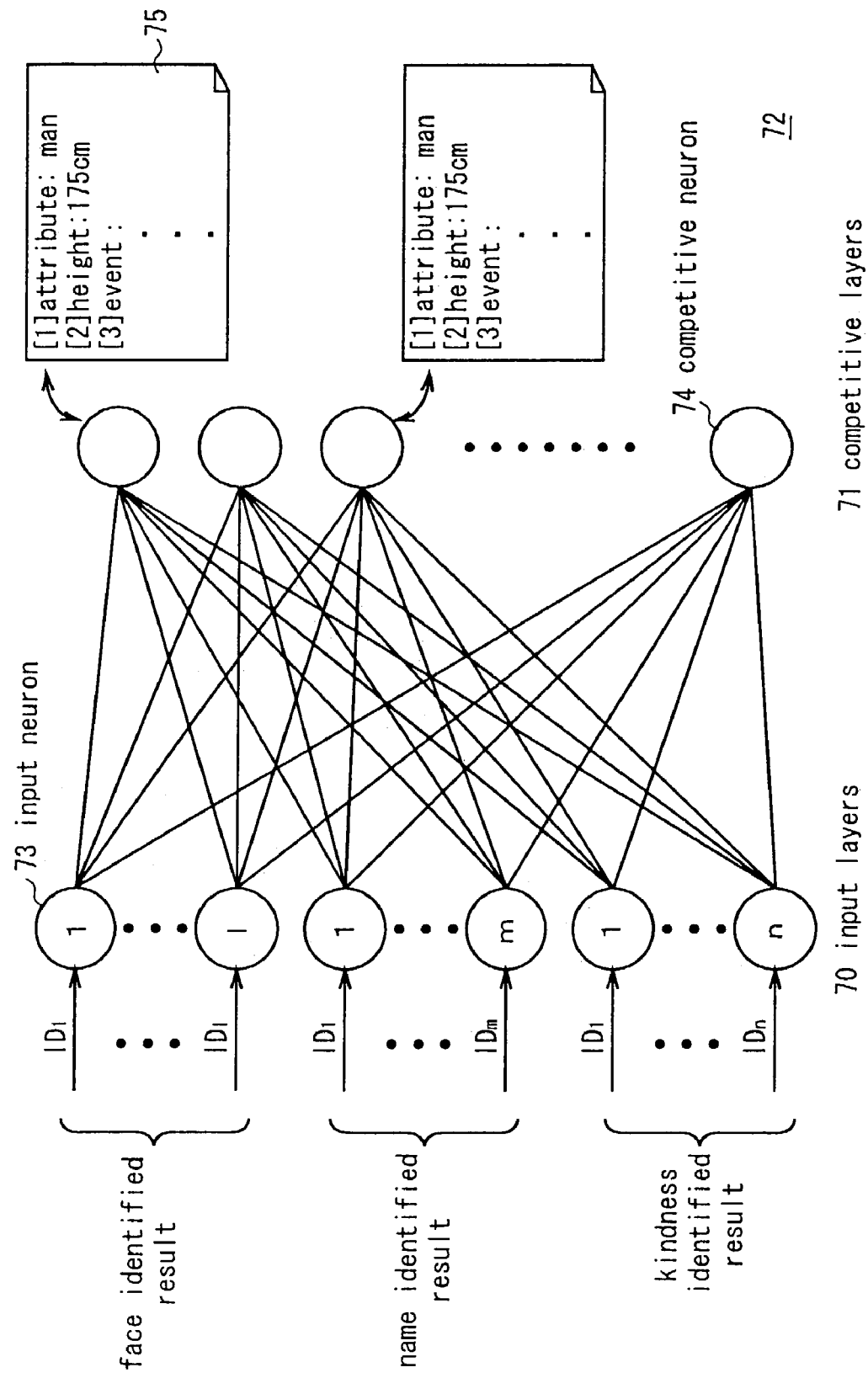
FIG. 9 is a conceptual diagram used in explaining an associative memory system in the present embodiment.

In this case, as typically shown in FIG. 9 as an example, a competitive neural network 72 applied to such an associative memory system takes a form of a hierarchical neural network consisting of two sets of layers: a set of input layers 70 and a set of competitive layers 71, and the total number of face IDs, name IDs, and kindness IDs and the same number of input neurons 73 are arranged in the set of input layers 70.

Meanwhile, a plurality of competitive neurons 74 are prepared in the set of competitive layers 71, and each of those competitive neurons 74 are connected with each of the input neurons 73 with the initial connection weight randomly set within a range of from 0 to 1.

Figure 14:
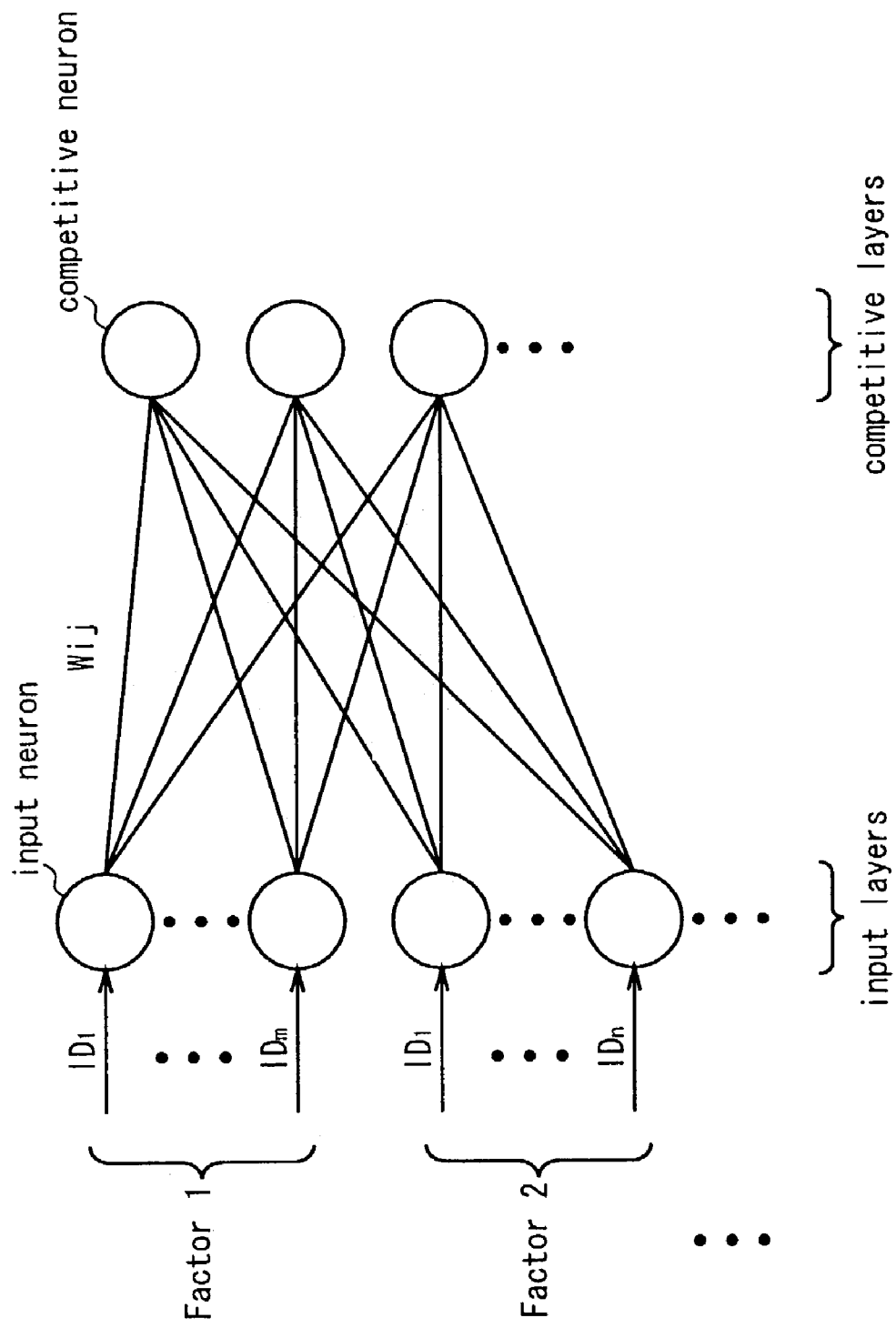
FIG. 14 is a conceptual diagram used in explaining an associative memory system to which a conventional competitive neural network is applied.

Then, in a manner similar to that described above with reference to FIG. 14, in the memory mode the control section 64 performs the statistical addition-learning in a way to strengthen the connection weights among the corresponding input neurons 73 and the competitive neurons 74 based on a face ID, a name ID, and a kindness ID informed from the face identifying section 60, the name identifying section 62, and the kindness identifying section 63.

Also, in the memory mode, like a semantic neural network and frames in a frame neural network for example, the control section 64 makes a file (this file is referred to as "symbol memo" 75 hereinafter) separately from the attributes (man, dog, or ball, etc.) identifiable from the shape of the user and of a variety of additional information on the user, supplied from a shape identifying section and a dimension identifying section, including the values of actual measurement of the size (height) in relation to the competitive neurons 74 corresponding to the user of such a competitive neural network 72, and this file is stored in the form of a frame in the internal memory 40A (FIG. 5), to be modified as required.

Figure 12:
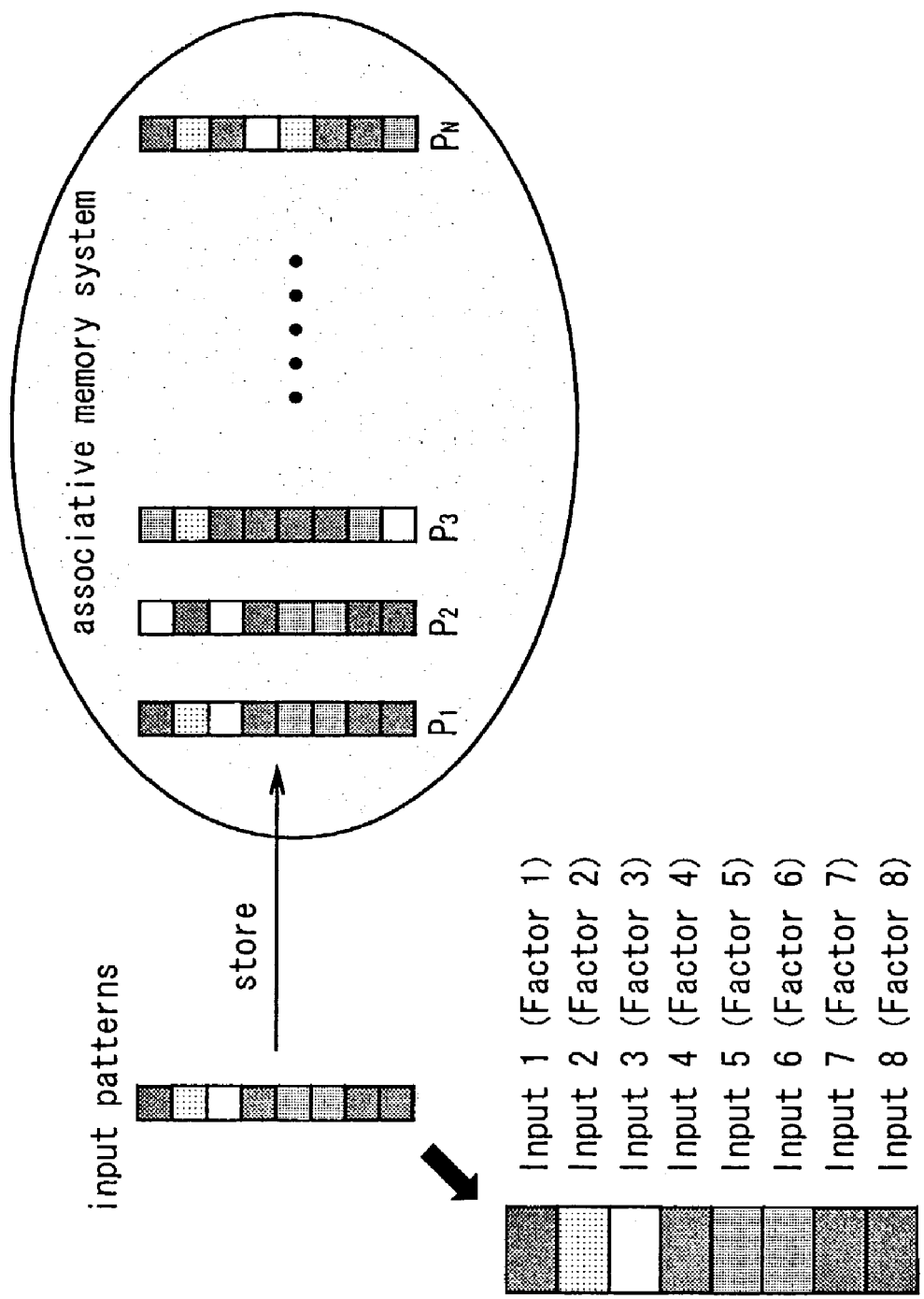
FIG. 12 is a conceptual diagram used in explaining an associative memory system.
Figure 13:
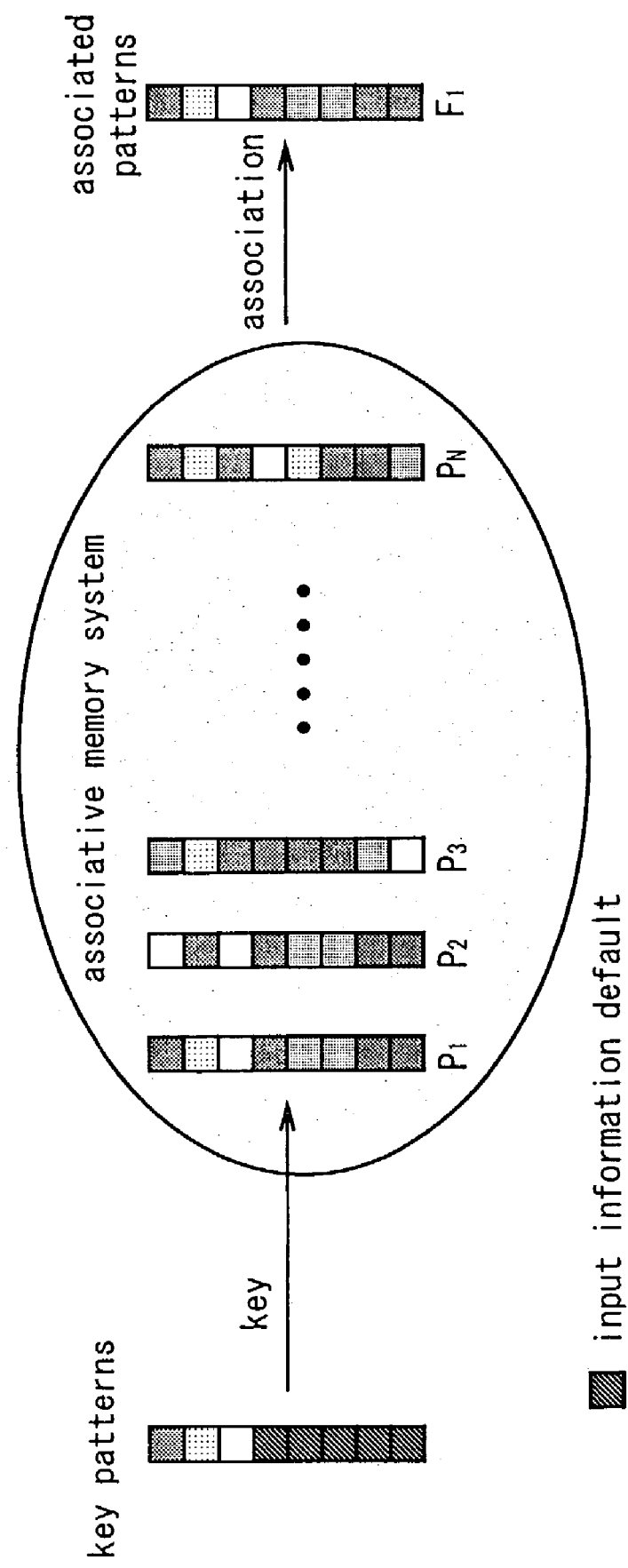
FIG. 13 is a conceptual diagram used in explaining an associative memory system.

Furthermore, in a like manner as described above with reference to FIGS. 12 and 13, in the memory mode the control section 64 brings up the face ID, name ID, and kindness ID of the user based on combined input patterns of separate pieces of information given from the face identifying section 60, the name identifying section 62, and the kindness identifying section 63, and at the same time reads the variety of additional information within the symbol memo 75, which is stored in relation to the competitive neurons 74 to be identified in the process of the association at that time.

Then the control section 64 sets in motion relevant actuators $A_1$–$A_{14}$ (FIG. 4) by means of sub-control sections 43A–43D (FIG. 5) based on the brought-up results and additional information, thus embodying behavior conforming to the brought-up results and additional information, and outputs audio sounds corresponding to the brought-up results and the symbol memo 75 by sending out the audio signal S3 to the speaker 54 (FIG. 5).

In this manner, in the robot 1, as for the face, name, and kindness of the user, the statistical addition-learning is performed with associative memory algorithm with the use of a competitive neural network, while as for other information on the user, it is designed such that it can be stored or updated immediately by storing it in the symbol memo 75, as is the case with the semantic network model and the frame model.

(2-3) Concrete Processing Content in Control Section 64

Figure 10:
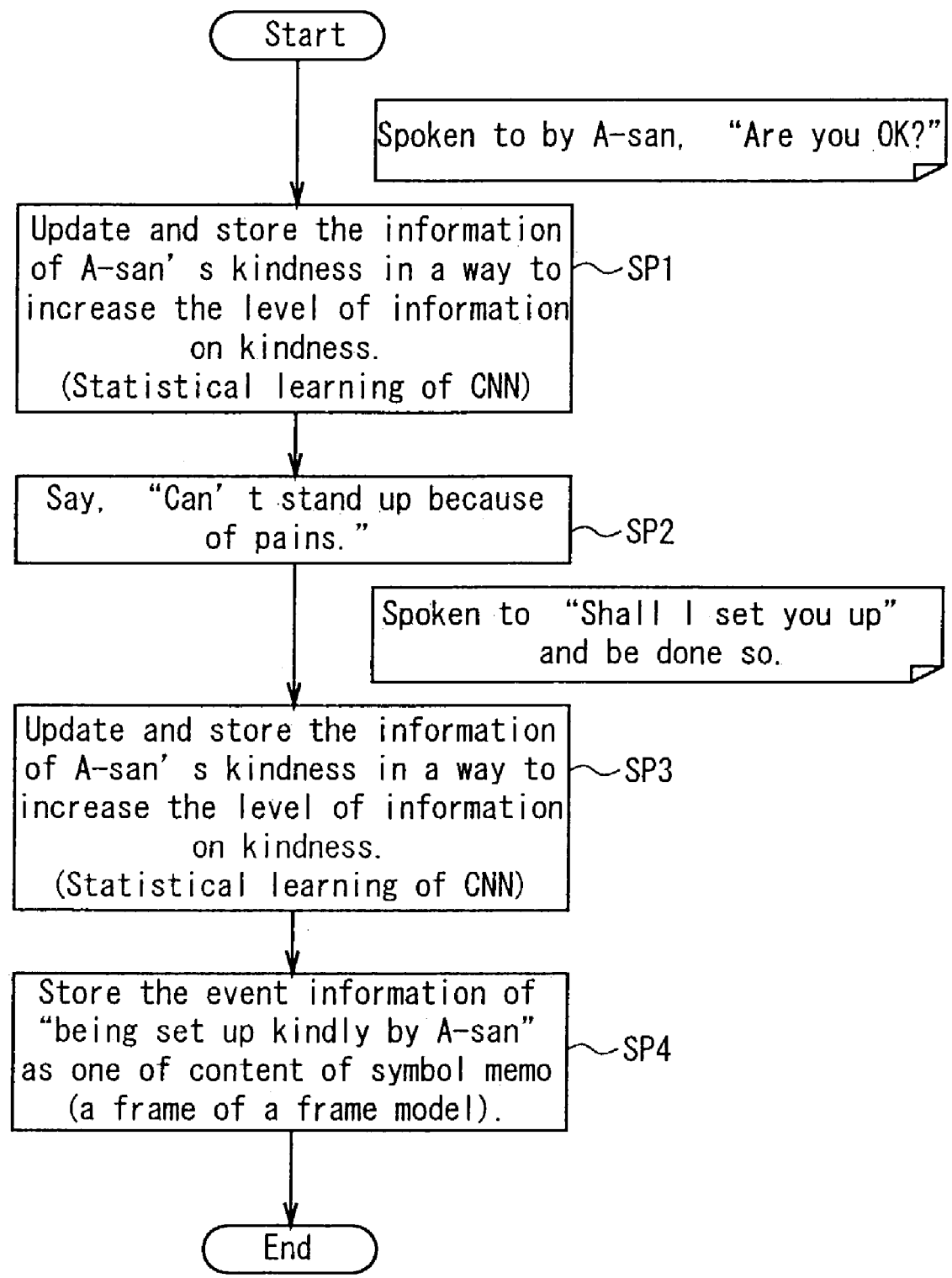
FIG. 10 is a flowchart used in explaining the storage of user information and behavioral manifestation utilizing the storage of the user information.
Figure 11:
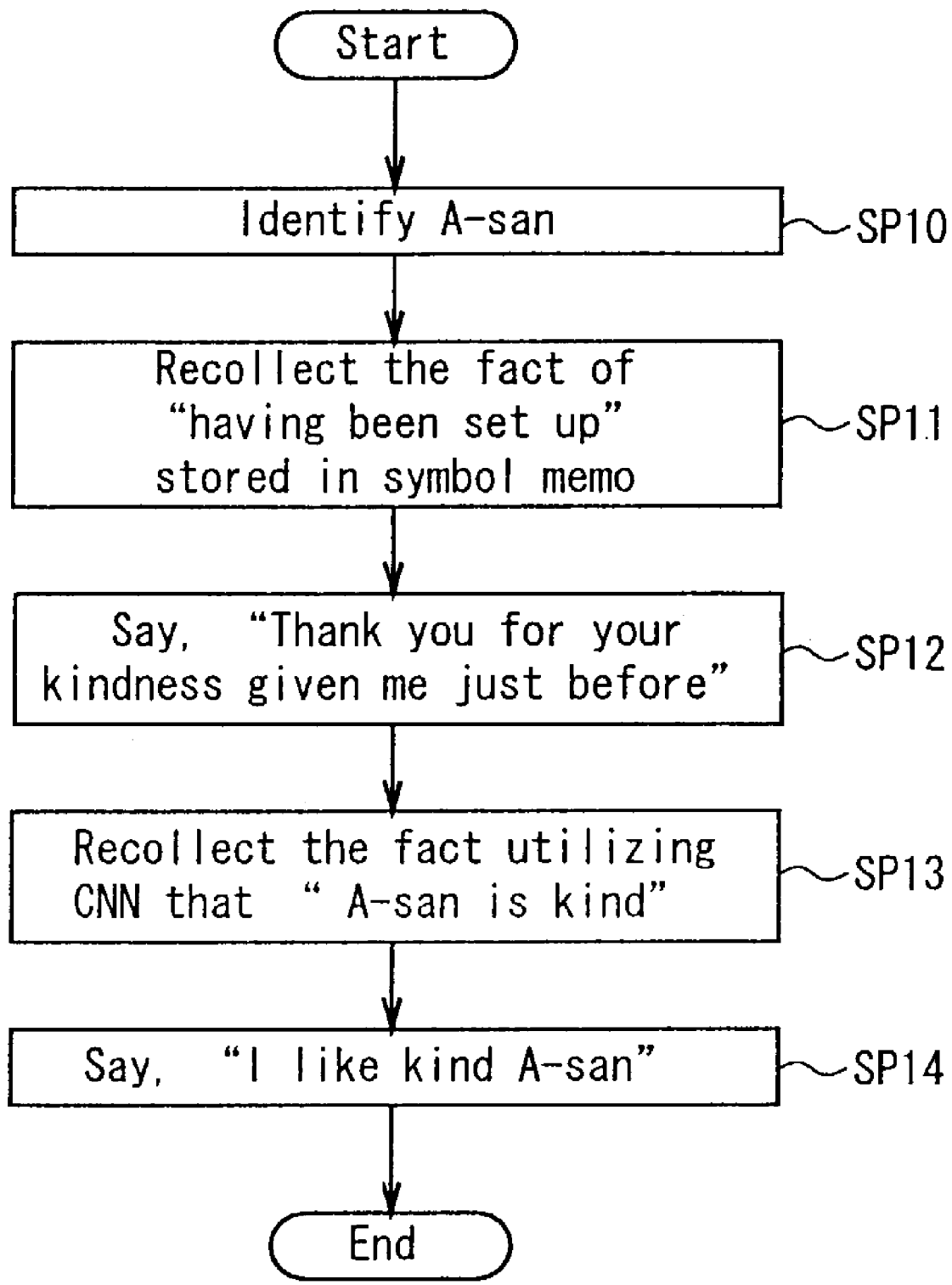
FIG. 11 is a flowchart used in explaining the storage of user information and behavioral manifestation utilizing the storage of the user information.

Next, concrete explanation is given on the processing content in the control section 64 of the memory concerning the user using FIGS. 10 and 11, assuming that the robot 1 has fallen down.

When the robot 1 fell down and has been spoken to "Are you OK?" by a person A being an already-known user, the control section 64 modifies the memory regarding the "kindness" of the person A in a way that the information of the person A being kind is intensified by the associative memory algorithm based on the identified results given separately from the face identifying section 60 and the kindness identifying section 63.

In practice, the control section 64 updates the information on the "kindness" of the person A in the competitive neural network 72 in a way to increase the connection weight between an input neuron 73 with a degree of "kindness" greater than that of an input neuron 73 whose connection weight with a competitive neuron 74 corresponding to the person A has been the greatest of the input neurons 73 corresponding to the "kindness" in the competitive neural network 72 (FIG. 9) and a competitive neuron 74 corresponding to the person A.

When an audio sound "Can't stand up due to pains" is outputted later through the speaker 54 (step SP2), followed by the word "Shall I raise you up?" spoken to and an action "raised to the feet" taken by the person A, the control section 64 modifies the memory regarding the "kindness" of the person A in much the: same way as described above such that the information of being kind is intensified again with the associative memory algorithm based on the identified results given at that time separately from the face identifying section 60 and the kindness identifying section 63 (step SP3).

At the same time, the control section 64 stores event information in the competitive neuron 74 corresponding to the person A and the related symbol memo 75: "Spoken to with kind word at 00:00", "Raised to the feet at 00:00" (step SP4).

Meantime, with the presence of the person A detected based on the recognized result from the face identifying section 60 in a while (step SP10), the control section 64 retrieves the competitive neuron 74 corresponding to the person A in the competitive neural network 72 by means of the associative memory algorithm based on the outputs of the face identifying section 60, the name identifying section 62, and the kindness identifying section 63 and reads a variety of additional information stored in the symbol memo 75 related to the competitive neuron 74.

Upon obtaining the event information "Spoken to with kind word at 00:00.", "Raised to the feet at 00:00." stored in the symbol memo 75, the control section 64 lets the speaker 54 utter a voice "Thank you for your kindness a little while ago." (step SP12).

Also, upon recollecting that "the person A is kind", by means of the associative memory algorithm in accordance with each of the recognized results of the face identifying section 60, the name identifying section 62, and the kindness identifying section 63 (step SP13), the control section 64 lets the speaker 54 utter an audio voice that "I like the kind person A" (step SP14).

In this manner, while performing the statistical addition-learning by means of the associative memory algorithm with the use of a competitive neural network and instantaneous learning utilizing the algorithm similar to the semantic network model and the frame model, the control section 64 lets the robot 1 embody behavior based on the results of the learning.

(3) Operation and Effect of this Embodiment

Structured as described above, this robot 1 memorizes the given first information (the face, name, and kindness of a user) by means of the associative memory algorithm with the use of a competitive neural network 72, and the other second information (event information, height, and attributes, etc.) by means of the frame form similar to the semantic network model and the frame model.

Therefore, the robot 1 is strong against noise as much as it can perform the statistical addition-learning concerning the learning of the first information, and as to the second information on the rest of others, it can secure a high degree of memory responsiveness.

Also, in the robot 1, as described above, thanks to the concurrent use of memorization, as a memory system by means of the associative memory algorithm with the use of the competitive neural network 72 and by means of the frame form, when increasing the storable information, it is possible to avoid an increase in the numbers of the input neurons 73 and the competitive neurons 74 by performing memorization of the information in the frame form, thus making it possible to effectively avoid beforehand an increase in the volume of calculation and the quantity of occupancy physical memory in the memory mode and the recollecting mode.

According to the above structure, the given first information (the face, name, and kindness of the user) is stored by means of the associative memory algorithm with the use of the competitive neural network 72, and the second information of the rest of others (event information, height, and attributes, etc.) is stored by the frame form similar to the semantic network model and the frame model, with the results that the learning of the first information is strong against noise as much as the statistical addition-learning can be performed, and that as for the second information of the rest of others, a high degree of memory responsiveness can be secured, and when increasing the number of pieces of storable information, it is possible to effectively avoid an increase in the numbers of input neurons 73 and competitive neurons 74, thus realizing a robot 1 that is strong against noise as to memorization and is excellent in the memory capacity, volume of calculation, quantity of physical memory, and memory responsiveness.

(4) Other Embodiments

In the embodiment described above, explanation is given on the case of the robot 1 constructed as shown in FIGS. 1–5 to which the present invention is applied, however, the present invention is not limited to it, but can be applied widely to various other robotic apparatus as well as a variety of other memory systems used for equipment other than robotic apparatus.

Also, in the embodiment described above, explanation is given on the case wherein a memory system employing the present invention is applied to memory concerning users, however, the present invention is not limited to it, but can be applied widely to storage of various other events and things. In this case, provision should be made for various sensors appropriate for those events and things by which to detect various factors concerning those events and things, and for identifying systems by which to identify a degree and type of each factor according to the outputs of those sensors.

Furthermore, in the embodiment described above, explanation is given on the case wherein the statistical addition-learning is performed for the face, name, and kindness of the user, by means of the associative memory algorithm with the use of a competitive neural network, and while learning (memorization) is performed in the frame form for the rest of other information on the user, however, the present invention is not limited to it, but part or the whole of the face, name, or kindness of the user may be learned in the frame form, and the statistical addition-learning may be performed for the rest of other information by means of the associative memory algorithm with the use of a competitive neural network.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A memory system, comprising:
   memory means for storing first information on a symbol in a way to strengthen a connection between relevant input neurons and competitive neurons in response to input patterns of a variety of inputs for each symbol, with the use of a competitive neural network having an input layer composed of a plurality of said input neurons and a competitive layer composed of a plurality of said competitive neurons,
   wherein said memory means stores, with the use of a frame knowledge representation model, second information on said symbol supplied separately from said variety of inputs in relation to said competitive neurons corresponding to said symbol, and
   wherein statistical addition-learning is performed for the first information and immediate learning is performed for the second information.

2. The memory system according to claim 1, comprising recollecting means for recollecting said first information on said relevant symbol in accordance with said input patterns of said variety of inputs and for recollecting said second information stored in relation to said symbol.

3. A memory method, comprising:
storing first information on a symbol in a way to strengthen a connection between relevant input neurons and competitive neurons in response to input patterns of a variety of inputs for each symbol, with the use of a competitive neural network having an input layer composed of a plurality of said input neurons and a competitive layer composed of a plurality of said competitive neurons,
storing second information on said symbol supplied separately from said variety of inputs with the use of a frame knowledge representation model in relation to said competitive neurons corresponding to said symbol,
wherein statistical addition-learning is performed for the first information and immediate learning is performed for the second information.

4. The memory method according to claim 3, further comprising:
recollecting said first information on said relevant symbol in accordance with said input patterns of said variety of inputs and;
recollecting said second information stored in relation to said symbol.

* * * * *